US009751203B2

(12) United States Patent
Wierzchon

(10) Patent No.: US 9,751,203 B2
(45) Date of Patent: Sep. 5, 2017

(54) LOCKING MECHANISM FOR AN ARTICULATING OSCILLATING POWER TOOL

(71) Applicants: Robert Bosch Tool Corporation, Broadview, IL (US); Robert Bosch GmbH, Stuttgart (DE)

(72) Inventor: Peter J. Wierzchon, Morton Grove, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 240 days.

(21) Appl. No.: 14/484,441

(22) Filed: Sep. 12, 2014

(65) Prior Publication Data

US 2015/0069724 A1    Mar. 12, 2015

Related U.S. Application Data

(60) Provisional application No. 61/876,939, filed on Sep. 12, 2013.

(51) Int. Cl.
   *B23B 31/36*        (2006.01)
   *B25F 3/00*         (2006.01)
   *B27B 19/00*        (2006.01)

(52) U.S. Cl.
   CPC ............... *B25F 3/00* (2013.01); *B23B 31/36* (2013.01); *B27B 19/006* (2013.01); *Y10T 279/13* (2015.01); *Y10T 279/3412* (2015.01)

(58) Field of Classification Search
   CPC ......... B23B 31/026; B23B 31/36; B25F 3/00; B27B 19/006; Y10T 279/13
See application file for complete search history.

(56) References Cited

U.S. PATENT DOCUMENTS

| 8,881,409 | B2 * | 11/2014 | Haman | ................. B27B 19/006 |
| | | | | 173/217 |
| 9,174,354 | B2 * | 11/2015 | Zhou | ....................... B27B 5/32 |
| 2009/0101380 | A1 | 4/2009 | Radif | |
| 2013/0126198 | A1 | 5/2013 | Campbell et al. | |
| 2013/0133210 | A1 * | 5/2013 | Weir | ...................... B23D 49/16 |
| | | | | 30/374 |
| 2013/0181414 | A1 | 7/2013 | Haman | |
| 2014/0190715 | A1 * | 7/2014 | Wong | .................... B25B 21/00 |
| | | | | 173/39 |

OTHER PUBLICATIONS

International Search Report and Written Opinion corresponding to PCT Application No. PCT/US2014/055388, mailed Nov. 25, 2014 (9 pages).

* cited by examiner

*Primary Examiner* — Eric A Gates
(74) *Attorney, Agent, or Firm* — Maginot Moore & Beck LLP

(57) ABSTRACT

An oscillating power tool includes a tool mount which can be articulated through a range of positions including less than zero degrees to ninety degrees. The tool mount can accept a variety of accessory tools which move in a reversing angular displacement as well as articulate throughout the range of positions. A locking mechanism is provided that can be manually actuated to prevent articulation or rotation of the articulator to thereby fix the tool mount to a pre-selected orientation.

15 Claims, 9 Drawing Sheets

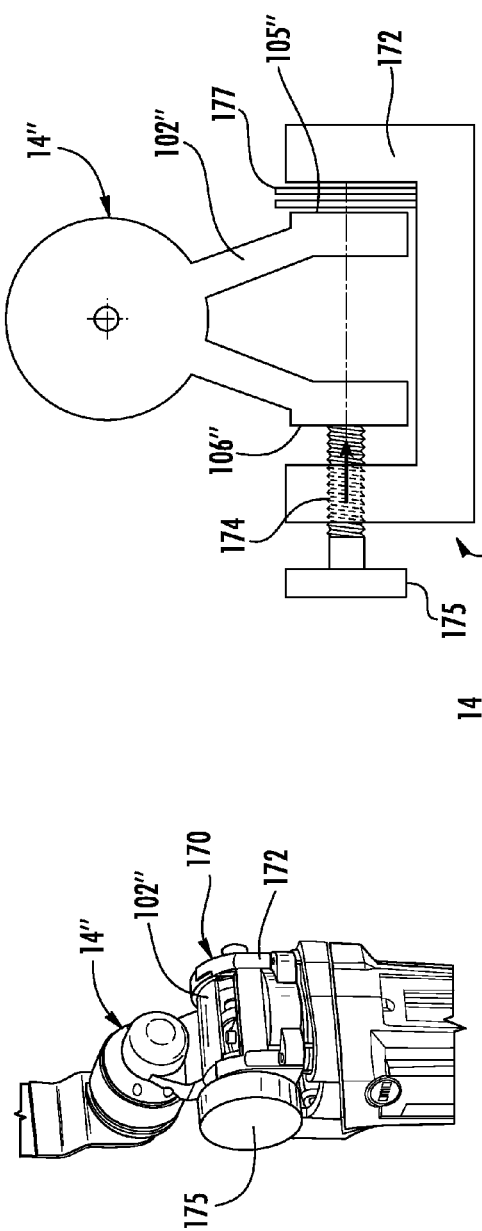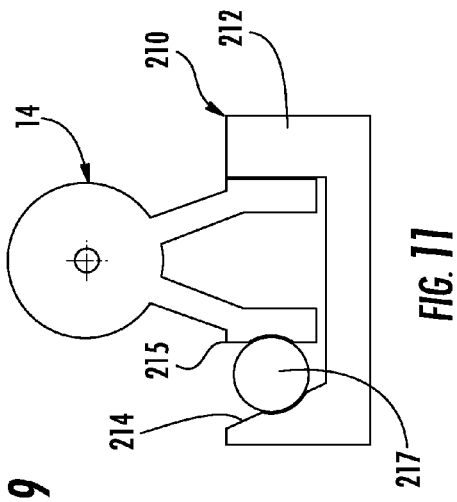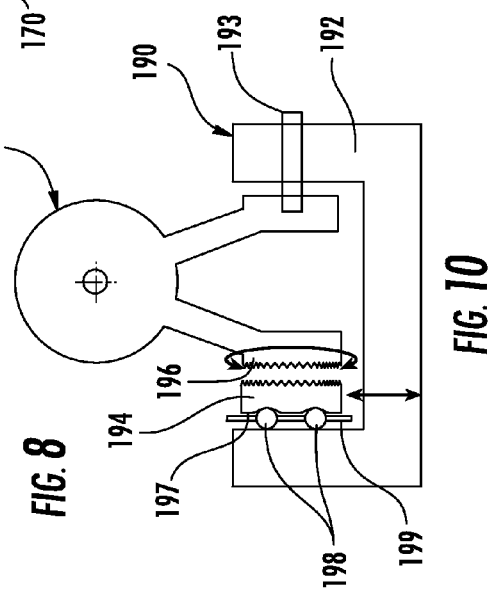

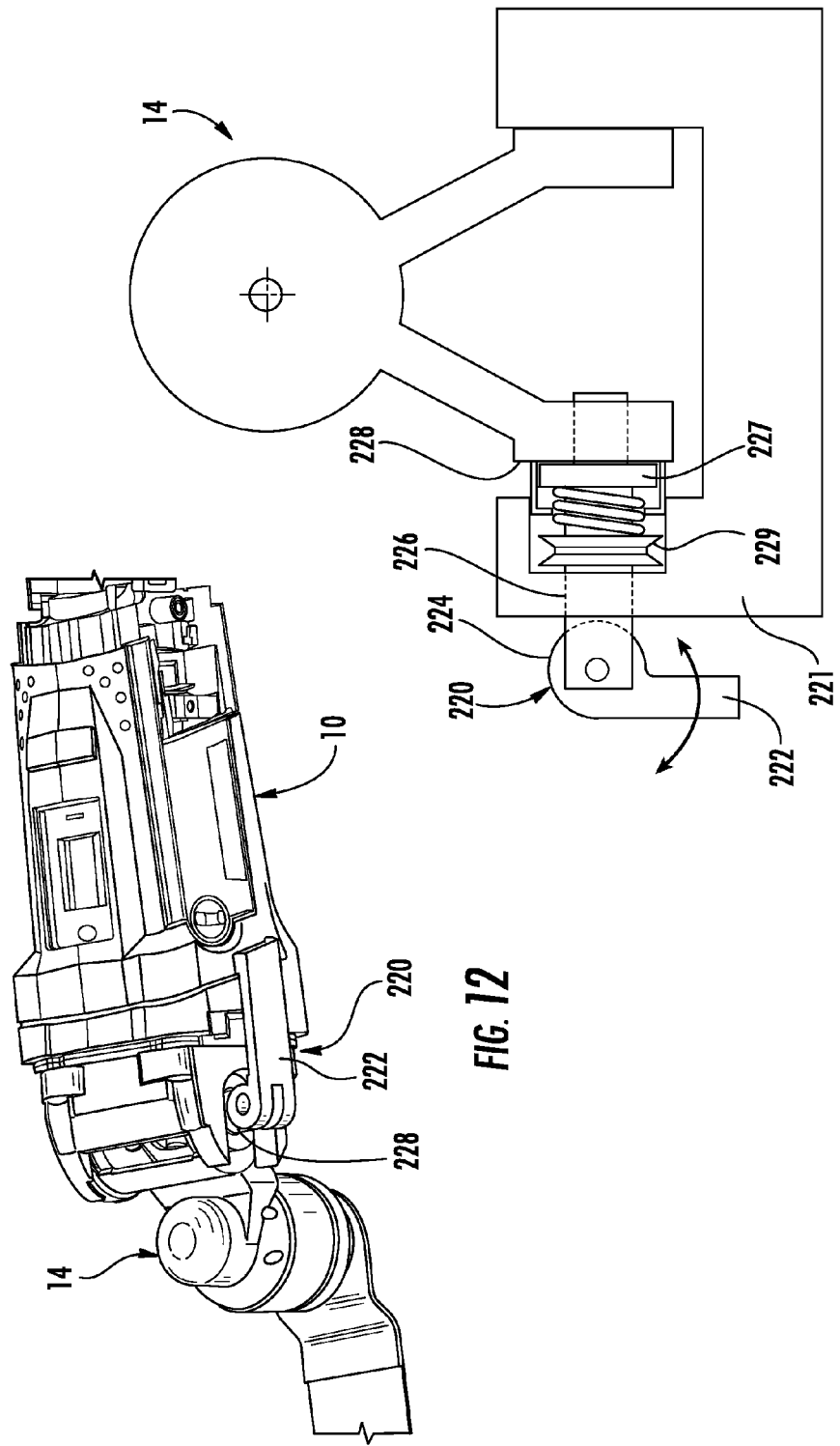

LOCKING MECHANISM FOR AN ARTICULATING OSCILLATING POWER TOOL

PRIORITY CLAIM

This application is a non-provisional filing of and claims priority to provisional application No. 61/876,939, filed on Sep. 12, 2013, the entire disclosure of which is incorporated herein.

FIELD

This disclosure relates to the field of power tools, and more particularly to a handheld power tool having an oscillating tool which can be articulated through a range of positions including less than zero degrees to ninety degrees.

BACKGROUND

Oscillating power tools are lightweight, handheld tools configured to oscillate various accessory tools and attachments, such as cutting blades, sanding discs, grinding tools, and many others. The accessory tools and attachments can enable the oscillating power tool to shape and contour workpieces in many different ways. Previously known oscillating tools, however, are limited in their ability to perform certain tasks in work areas that are difficult to access. These oscillating power tools have fixed tool heads which can limit the number of tasks that can be performed. Oscillating power tools with fixed tool heads can also cause the user to locate the tool in less convenient positions when performing work. Sometimes the position of the power tool necessitated by the nature of the workpiece can be inadequate to effectively complete a task. The user may be forced to either select another tool to complete the task, or resort to non-powered tools, both of which can increase the amount of time to complete a task as well as reduce the amount of time the user can work on the workpiece due to fatigue.

For example, while different types of accessory tools are available to perform cutting, scraping, and sanding operations, the use of such accessory tools is limited in an oscillating power tool where the tool head is fixed with respect to the tool, the tool body or tool handle. The range of uses for these accessory tools, consequently, can be rather narrow, since the output orientation of the oscillating tool head is fixed according to the position of the power tool, the tool body or tool handle. For example, a flush cutting blade accessory for an oscillating power tool can be used to trim or shave thin layers of material from the surface of a workpiece. Because this type of accessory can present a risk that the blade can gouge the surface and possibly ruin the workpiece, orientation of the tool head is important and made more difficult in power tools with fixed tool heads. What is needed, therefore, is a handheld articulating oscillating power tool that provides access to areas that are otherwise inaccessible or difficult to access.

SUMMARY

In accordance with one embodiment of the disclosure, there is provided an articulating power tool including a housing and a motor located in the housing. An actuator is operatively coupled to the drive shaft of the motor and configured to convert the rotation of the drive shaft to a reversing angular displacement. A tool holder is coupled to the actuator and configured to move in response to movement of the actuator. An articulator is operatively coupled to the housing and to the tool holder, wherein the articulator is configured to adjust the tool holder through a range of positions. A locking mechanism is provided that is manually operable to lock the articulator to an articulated position. In one aspect, the locking mechanism includes a translatable locking plate and a ball and ramp clamping mechanism that is operable to translate the locking plate between a locking position in which the locking plate bears against a surface of the articulator to prevent further articulation, and a free position in which the locking plate is offset from the articulator surface to permit further articulation. The locking mechanism of this embodiment provides a low friction mechanism that can be easily manually actuated. The locking mechanism does not require lateral translation of the tool mount so that no modifications are required to other components of the tool, such as dust shielding.

In other embodiments, the locking mechanism can comprise a friction plate or spring plate pack with a manually tightened pressure screw that presses the articulator against the friction plate pack to fix the articulator against articulation. An additional actuator may be in the form of an eccentric lever with an eccentric cam element operable to apply pressure to the articulator.

BRIEF DESCRIPTION OF THE DRAWINGS

FIG. 8 is a perspective view of an oscillating tool with another locking mechanism according to the disclosure.

FIG. 9 is a top view of the locking mechanism shown in FIG. 8.

FIG. 10 is a top view of a locking mechanism according to a further aspect of the disclosure.

FIG. 11 is a top view of a locking mechanism according to a another aspect of the disclosure.

FIG. 12 is a perspective view of a further locking mechanism according to the disclosure.

FIG. 13 is a top view of another locking mechanism according to the disclosure.

DETAILED DESCRIPTION

Figure 1:
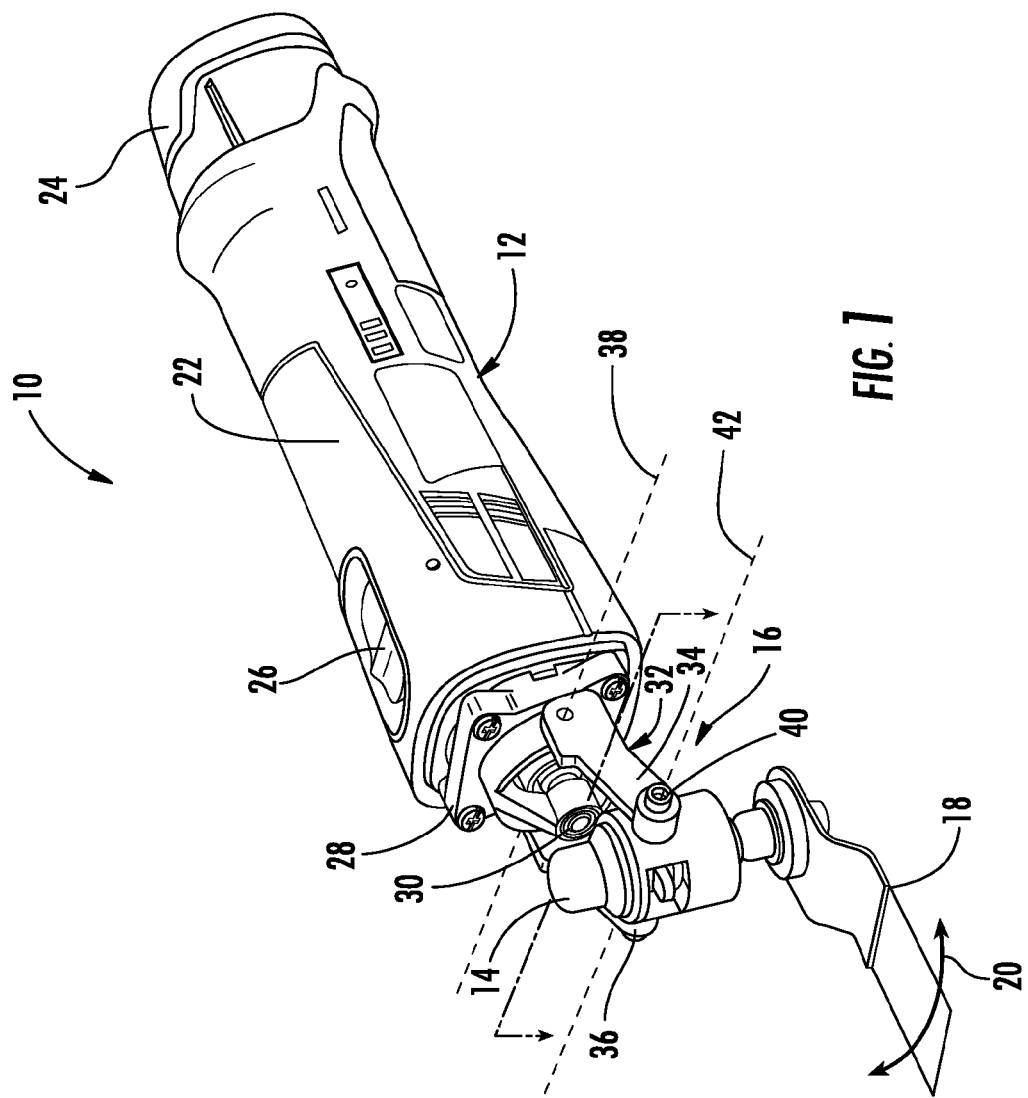
FIG. 1 is a perspective view of an oscillating power tool including an articulating tool holder with articulating arms located generally parallel to the longitudinal axis of the tool.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 illustrates an oscillating power tool 10 having a generally cylindrically shaped housing 12 and a tool holder 14, or tool head, located at a front end 16 of the tool 10. The tool holder 14 is adapted to accept a number of different tools or tool accessories, one of which is illustrated as a scraping tool 18. The scraping tool 18 oscillates from side to side or in a reversing angular displacement along the direction 20. Other oscillating accessory tools are known and include those having different sizes, types, and functions including those performing cutting, scraping, and sanding operations. The housing 12 can be constructed of a rigid material such as plastic, metal, or composite materials such as a fiber reinforced polymer. The housing 12 can include a nose housing (not shown) to cover the front of the tool, the tool head, and related mechanisms.

The housing 12 includes a handle portion 22 which can be formed to provide a gripping area for a user. A rear portion 24 of the housing can include a battery cover which opens and closes to accept replaceable or rechargeable batteries. The cover can also be part of a replaceable rechargeable battery so that the cover stays attached to the rechargeable battery as part of a battery housing. In other embodiment, the tool 10 can be powered by another energy source such as harvesting from adjacent power tool, vessel (tool box), solar energy, DC, AC, or the like. Housing 12 includes a power switch 26 to apply power to or to remove power from a motor (to be described later) to move the tool 18 in the oscillating direction 20. The power switch 26 can adjust the amount of power provided to the motor to control motor speed and the oscillating speed of the tool 18.

The front end 16 of the tool 10 includes a drive shaft support 28 which receives a drive shaft coupled to the motor, an end portion 30 of which is supported for rotation within the support 28. An articulator 32 includes an articulating support having a first articulation arm 34 and a second articulation arm 36, each having a first end pivotally coupled to the drive shaft support 28 at an axis of rotation 38. A second end of the arms 34 and 36 are coupled to the tool holder 14 by respective bolts 40. Each of the bolts 40 can fix the arms 34 and 36 to the tool holder 14 such that rotation of the tool holder 14 does not occur at the location of the bolts 40. The interface between the arms 34 and 36 and the tool holder can, however, be configured to allow rotational movement of the tool holder around an axis 42 to provide an additional location of tool head adjustment.

Figure 2:
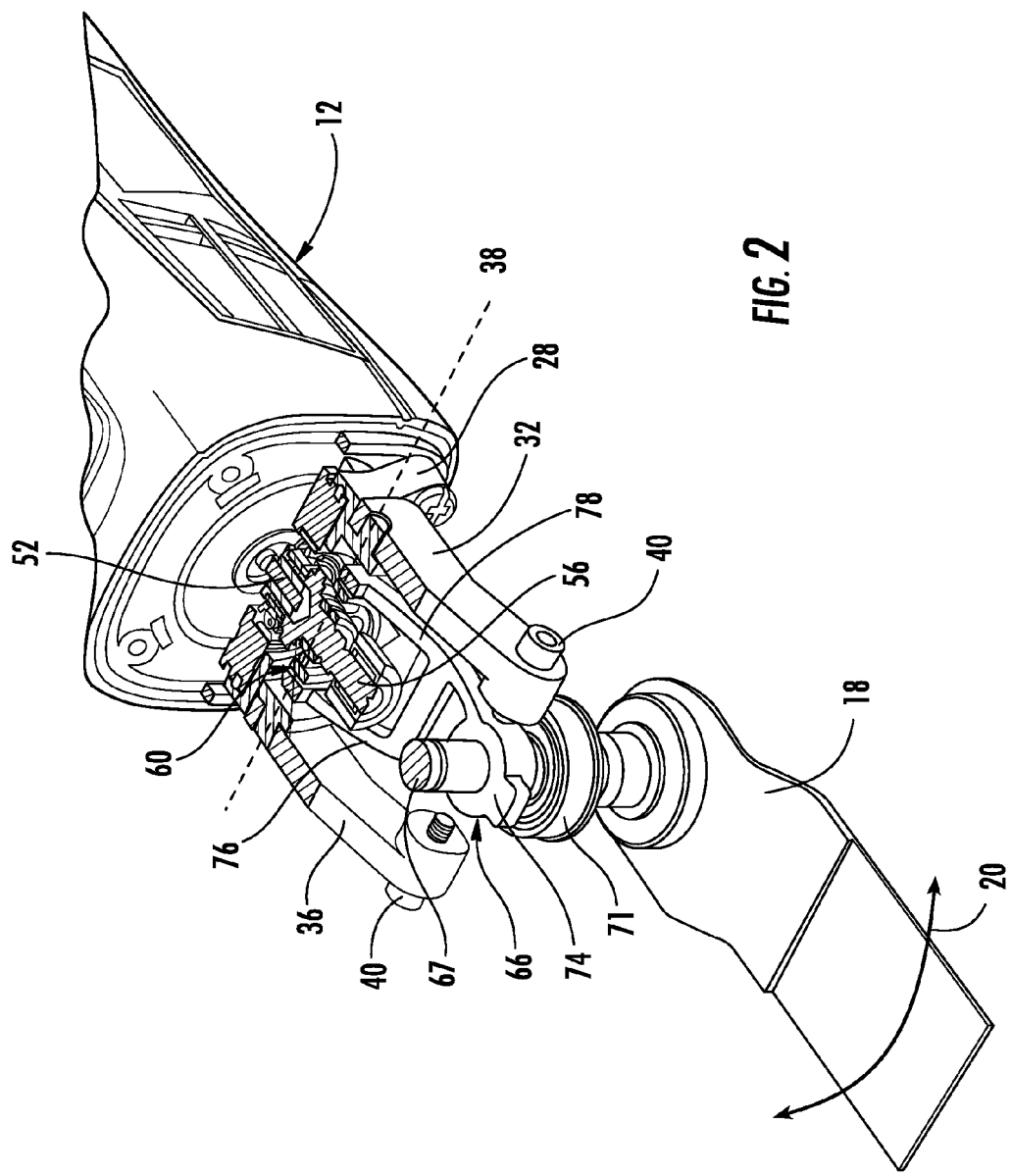
FIG. 2 is a partial cross-sectional view of the tool shown in FIG. 1 along a line 2-2 without the housing for the tool holder.

As shown in FIG. 2 the motor drive shaft 52 projects from the housing 12 and is generally aligned along a longitudinal axis of the housing 12. An eccentric drive shaft 56 is mounted to the end of the drive shaft 50 and includes a central portion to which an eccentric drive bearing 60 is mounted. The eccentric bearing 60 operates as an "eccentric" to convert the rotational motion of the drive shaft 52 to a linear motion. A link 66 is operatively coupled to the eccentric drive bearing 60 and to a tool mount 67 located within the tool holder 14 that is configured to engage a bolt 70 (FIG. 3) to fasten the tool 18 in a fixed position with respect to the tool mount 67. Bearings 71, operatively coupled to the tool mount 67, provide for rotational movement of the tool mount 67 within the tool holder 14. The tool mount 67 engages an end 74 of the link 66.

As further illustrated in FIG. 2, the link 66 is operatively coupled to and actuated by the eccentric bearing 60 to move responsively to the rotation of the drive shaft 52. The end 74 therefore actuates the tool 18 bi-directionally in the direction 20 of FIG. 1. In one embodiment of the disclosure, the link includes a first branch 76 and a second branch 78 coupled at one end to the connecting end 74 and at an opposite end to the eccentric bearing 60.

Figure 3:
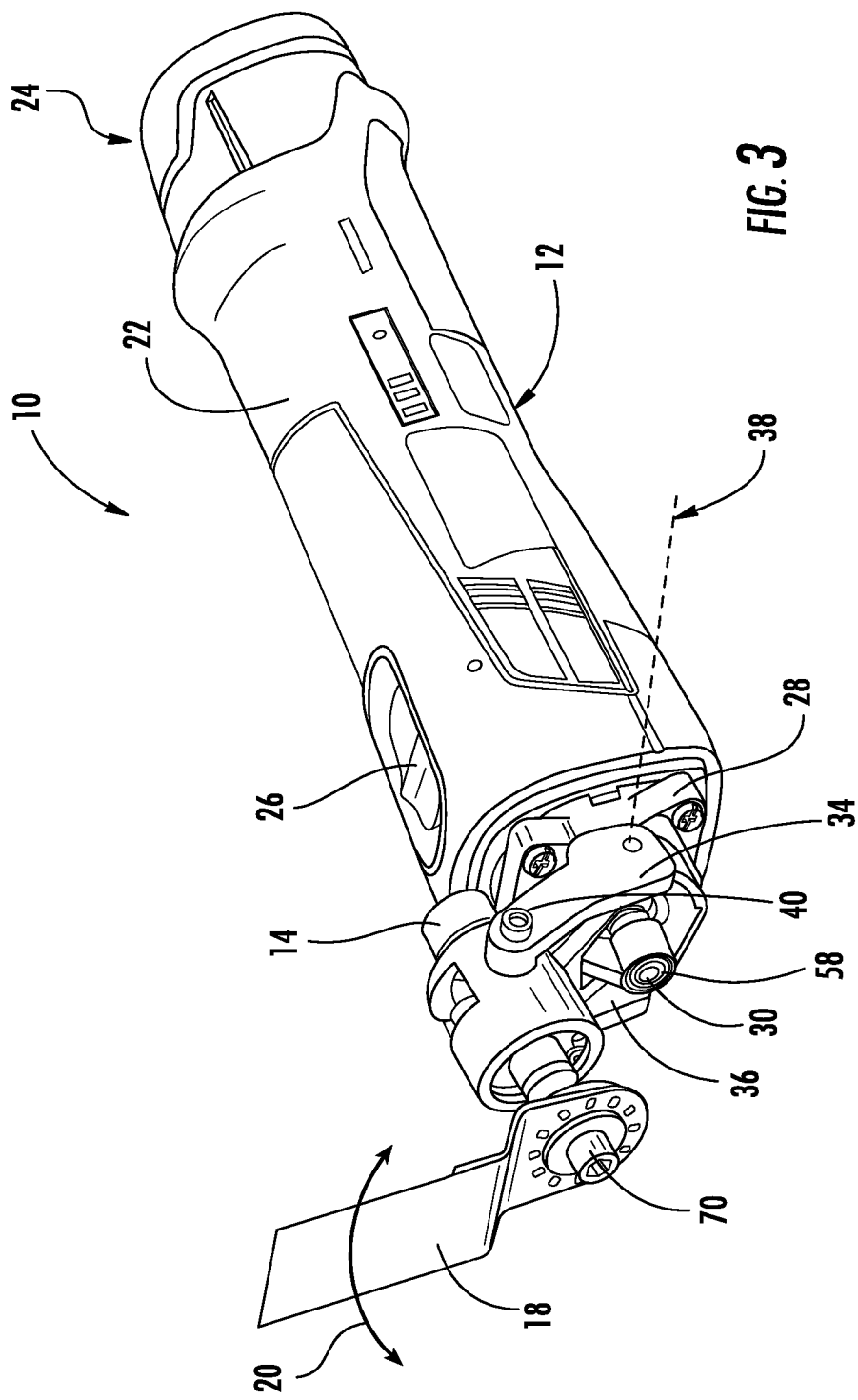
FIG. 3 is a perspective view of the oscillating power tool of FIG. 1 with the articulating arms located at approximately ninety (90) degrees with respect to the longitudinal axis of the tool.
Figure 6:
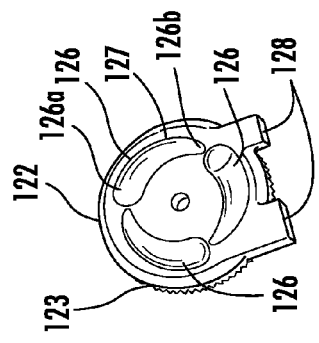
FIG. 6 is an enlarged perspective view of a locking plate of the locking mechanism shown in FIGS. 4-5.

FIG. 3 provides a view of the oscillating power tool 10 in which the articulating arms are located at approximately ninety (90) degrees with respect to the longitudinal axis of the tool. While articulation is illustrated at less than zero degrees and ninety degrees, the embodiments are not limited to this range of motion. Articulation at greater than ninety degrees is also possible. In another embodiment, articulation at less than zero degree is possible (from the zero degree position).

As shown in FIG. 1, the first articulation arm 34 and the second articulation arm 36 are pivotably coupled to a support 28 to move in an arc about the axis 38. Because the arms 34 and 36 rotate about the axis 38 and the link 66 is coupled to the tool head 14, the branches 76 and 78 of the link 66 also generally rotate about the axis 38. Consequently, side-to-side movement of the branches 76 and 78 (and thus the tool holder 14) occurs at a predefined pivot axis due to the location of the pivot axis 38, the location of the arms 34 and 36, and the location of the drive bearing 60. FIG. 2 is a partial sectional perspective view of a portion of the power tool 10 of FIG. 1 along a line 2-2 with the housing for the tool holder 14 removed to illustrate the connection of the link 66 to the tool mount 67. FIG. 3 additionally illustrates the rotational axis 38 and its location through the pivot points of the arms 34 and 36, and through the pivot point of the link 66.

In the embodiment of FIGS. 1-3, the articulated position of the tool mount 14 is fixed by tightening the bolt 40. When the bolt 40 is loosened, the arms 34, 36 of the articulator 32 and the branches 76, 78 of the link 66 act as an articulating linkage as the tool mount 14 is moved between the parallel position shown in FIG. 1 and the perpendicular position shown in FIG. 3. Once the operator has positioned the tool mount and tool 18 at the desired orientation, the bolt 40 can be manually tightened to hold the articulating linkage fixed.

Figure 4:
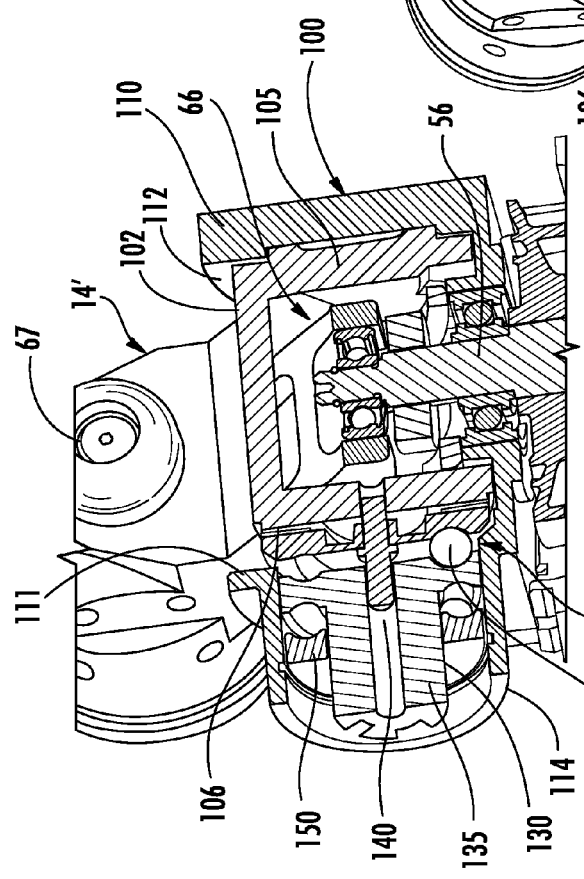
FIG. 4 is a partial cross-sectional view of an oscillating power tool, such as the tool of FIG. 1, with a locking mechanism for locking the articulating arms according to one aspect of the disclosure.
Figure 5:
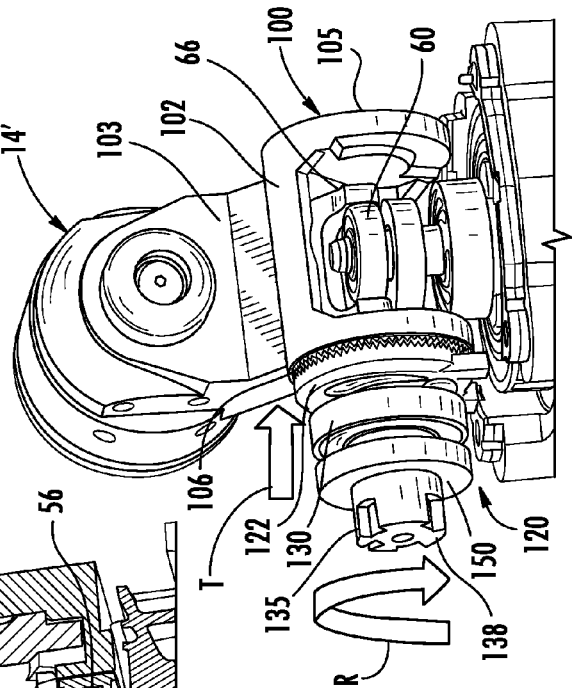
FIG. 5 is a perspective view of the oscillating power tool and locking mechanism shown in FIG. 4.

In another embodiment, the tool 10 is provided with a locking mechanism 100, as shown in FIGS. 4-7. The mechanism utilizes a ball-in-ramp clamping mechanism to fix the tool mount 14' at a user selected angle relative to the longitudinal axis of the tool. The locking mechanism 100 incorporates modifications to the tool mount 14' to include a barrel element 102 that encloses the eccentric drive shaft 56, eccentric drive bearing 60 and link 66, and their associated components, as shown in FIGS. 4-5. The barrel element 102 is integrated with the tool mount 14' by an extension 103 in lieu of the arms 34, 36 of the embodiment of FIG. 1.

The tool mount barrel element 102 includes a pivot surface 105 at an outboard end of the barrel and a clamping surface 106 at an inboard end. The clamping surface 106 may be provided with some form of surface treatment for enhanced engagement or frictional engagement, such as radial splines in one specific embodiment. The clamping surface 106 is configured for a tight anti-rotation engagement with an opposing clamping surface as described in more detail herein.

The locking mechanism 100 further includes a locking mechanism housing 110 that is concentrically disposed around the barrel portion 102 of the tool mount. The locking mechanism housing 110 is fixed to the tool housing 12 in a suitable manner, including being integrally formed with the tool housing. The mechanism housing 110 defines a cylindrical chamber 111 that receives the barrel portion 102 and that is open at one side for passage of the extension 103, as shown in FIG. 4. The mechanism housing 110 includes an inner pivot surface 112 for sliding rotational contact with the pivot surface 103 of the tool mount barrel element 102. The mechanism housing further includes a cylindrical portion 114 extending along the longitudinal axis of the mechanism housing and perpendicular to the tool housing 12. The cylindrical portion receives the clamping mechanism 120 and opens to the chamber 111 so that the clamping mechanism can engage the tool mount barrel portion to fix the articulated position of the tool mount.

In one aspect, the locking mechanism 100 further includes a clamping mechanism 120, and more particularly a "ball-in-ramp" clamping mechanism. The clamping mechanism includes a locking plate 122 that includes a clamping surface 123 configured and arranged for anti-rotation clamping engagement with the clamping surface 106 of the tool mount barrel portion 102. As seen in more detail in FIG. 6, the locking plate 122 includes a number of annular channels 126 defined in a facing surface 127 on the opposite face from the clamping surface 123. The channels 126 are configured to receive a corresponding ball 145 (FIG. 4), which may be similar to a ball bearing, or other suitable movable member such as a roller. The channels are configured to become progressively more shallow from end 126a to end 126b so that as each ball 145 moves in the clockwise direction relative to the facing surface 127 it translates away from the facing surface.

Figure 7:
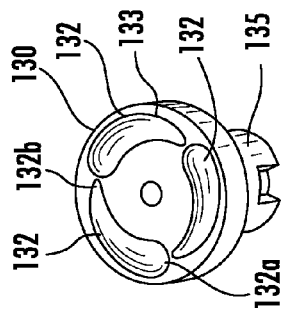
FIG. 7 is an enlarged perspective view of an input plate of the locking mechanism shown in FIGS. 4-5.

The locking plate 122 is configured to interface with an input plate 130, shown in detail in FIG. 7. The input plate 130 includes a like number of channels 132 defined in its own facing surface 133, with each channel 132 likewise configured to receive a ball 145. The channels 132 also become progressively more shallow from end 132a to end 132b so that clockwise rotation of the input plate 130 causes each ball 145 to move toward the shallow end 132b of each channel which then causes the balls 145 to translate away from the facing surface 133 toward the locking plate 122. In other words, as shown in FIG. 5, rotation of the input plate 130 in the direction of arrow R causes translation of the locking plate 122 in the direction of the arrow T toward the clamping surface 106 of the tool mount barrel element 102. This transverse or perpendicular movement causes the clamping surface 123 of the locking plate 122 to bear against the clamping surface 106 to lock the barrel element 102 against rotation. The locking plate 122 may be provided with anti-rotation lugs 128 that ride within corresponding grooves (not shown) defined in the locking mechanism housing 110 to hold the locking plate against rotation while allowing it to translate toward and away from the barrel element 102.

The input plate 130 includes a transversely projecting hub 135 that extends through the cylindrical housing portion 114. A roller bearing assembly 150 may be mounted within the cylindrical housing portion 114 in contact with the hub 135 of the input plate 130 to facilitate rotation of the input plate relative to the locking mechanism housing 110. The roller bearing assembly may be fixed within the housing in a conventional manner, such as with a snap-ring. The roller bearing assembly 150 may be separate from the input plate 130 or may be integrated with the input plate or hub 135. The outboard end 138 of the hub 135 may be configured to mate with a tool, knob, handle, or other manually operable component capable of rotating the input plate 130. In one embodiment, the end 18 may be configured to mate with a tool used to mount the tool 18 to the tool mount 14'. The clamping mechanism 120 may include a centering pin 145 that extends through concentric bores in the input plate 130, locking plate 122 and tool mount barrel element 102, as shown in FIG. 4. The centering element also operates as an axle for rotation of the clamping mechanism components within the cylindrical housing portion 114 of the locking mechanism housing 110.

The locking mechanism 100 is easily operated to lock the articulating tool mount 14' at a user-selected orientation. Once the tool mount and tool are situated in the desired orientation, the hub 135 of the input plate 130 is manually rotated in the clockwise direction, as indicated by the arrow R in FIG. 5. This rotation moves the ramps 132 of the input plate 130 in the clockwise direction so that the balls 145 trapped between the locking plate 122 and input plate 130 are gradually forced to the shallow ends 132b and 126b, respectively, of the channels 132 and 126. Since the transverse or translational position of the input plate 130 is fixed, the act of forcing the balls 145 into the shallow ends of the respective channels means that the balls 145 move away from the fixed facing surface 133, toward the facing surface 127 of the locking plate, which in turn transmits force against the locking plate to cause it to translate transversely toward the clamping surface 106 of the tool mount barrel element 102. Since the barrel element 102 is translationally fixed, pressure from the locking plate locks the respective clamping surfaces 106 and 123 together to prevent rotation of the barrel element and tool mount 14'.

Rotation of the input plate hub 135 in the counterclockwise gradually moves the deeper end 132a of the input plate to the balls 145 and continued counterclockwise eventually positions the plates and balls relative to each other so that the balls 145 are all situated in the deeper ends of both sets of channels 126, 132. In this position the clamping mechanism is no longer generating a clamping force against the tool mount barrel element 102, so the tool mount 14' is free to be articulated to another position. A return spring (not shown) may be incorporated between the two clamping surfaces 106 and 123, concentrically disposed about the centering pin 140. The spring thus ensures disengagement of the two clamping surfaces 106, 123 once the clamping pressure has been removed. It is contemplated that the slope of the ramps 132 can be customized to the user's desire. For instance, a collection of input plates 130 may be provided with different ramp configurations.

Other locking mechanism may be provided for locking the articulator 32 at a user-selected orientation. One such locking mechanism 170 is shown in FIGS. 8-9. The locking mechanism 170 engages a modified barrel element 102" of a tool holder 14" between a pressure screw 174 and a friction disc stack 177. The friction disc stack 177 is disposed between a housing 172, which is configured similar to the housing 110, and a locking surface 105" of the barrel element 102". The pressure screw 174 is threaded through a wall of the housing 172 to bear against a contact surface 106" of the barrel element. A knob 175 may be provided to facilitate rotation of the pressure screw. As the screw is rotated the screw pushes the barrel element 102" into the friction disc stack 177 which is then pressed into the housing 172. With enough pressure the friction plate stack fixes the locking surface 105" relative to the housing to thereby hold the articulator, and ultimately the tool holder 14" in the user-selected position.

Another locking mechanism 190 shown in FIG. 10 includes a housing 192 similar to the housing 110. The tool holder 14 is modified to include a locking surface 196 that is acted on by a locking plate 194. The surface 196 and plate 196 may be provided with anti-rotation or friction-enhancing features, such as radial splines. The locking plate 194 is pressed against the surface 196 by balls 198 moving between the housing 192 and ramp surfaces 197 on the locking plate. The balls 198 may be mounted within a carrier 199 that can be moved longitudinally to move the balls up the ramp surfaces 197. This movement of the balls generates a transverse force between the locking plate 194 and the locking surface 196 to fix the tool holder 14 at its articulated orientation. A locator pin 193 may be provided in the housing 192 to act as a pivot axis for the tool holder 14 and to prevent disengagement of the tool holder from the locking mechanism 190 when no locking pressure is being applied.

The locking mechanism 210 shown in FIG. 11 operates on a similar principle to the mechanism 190. A ball 217 is disposed between a tapered surface 214 of the housing 212 and an engagement surface 215 of the tool holder 14. Translating the ball 217 longitudinally toward the tool housing advances the ball along the tapered surface 214 to thereby exert a transverse force against the engagement surface 215, to thereby fix the tool holder against rotation. The ball 217 may mounted within a carrier that is movably mounted to the housing 212.

The locking mechanism 220 shown in FIGS. 12-13 employs an eccentric lever 222 with an eccentric cam hub 224. Pivoting the lever 22 causes the cam hub 224 to pivot eccentrically on the outside surface of the housing 221. A pressure pin 226 pivotably mounted to the eccentric cam hub includes a flange 227 that presses against a contact surface 228 of the tool holder 14. A spring pack 229 may be provided to push the pressure pin 226 away from the tool holder as the eccentric lever is moved to its unlocked position.

Figure 14:
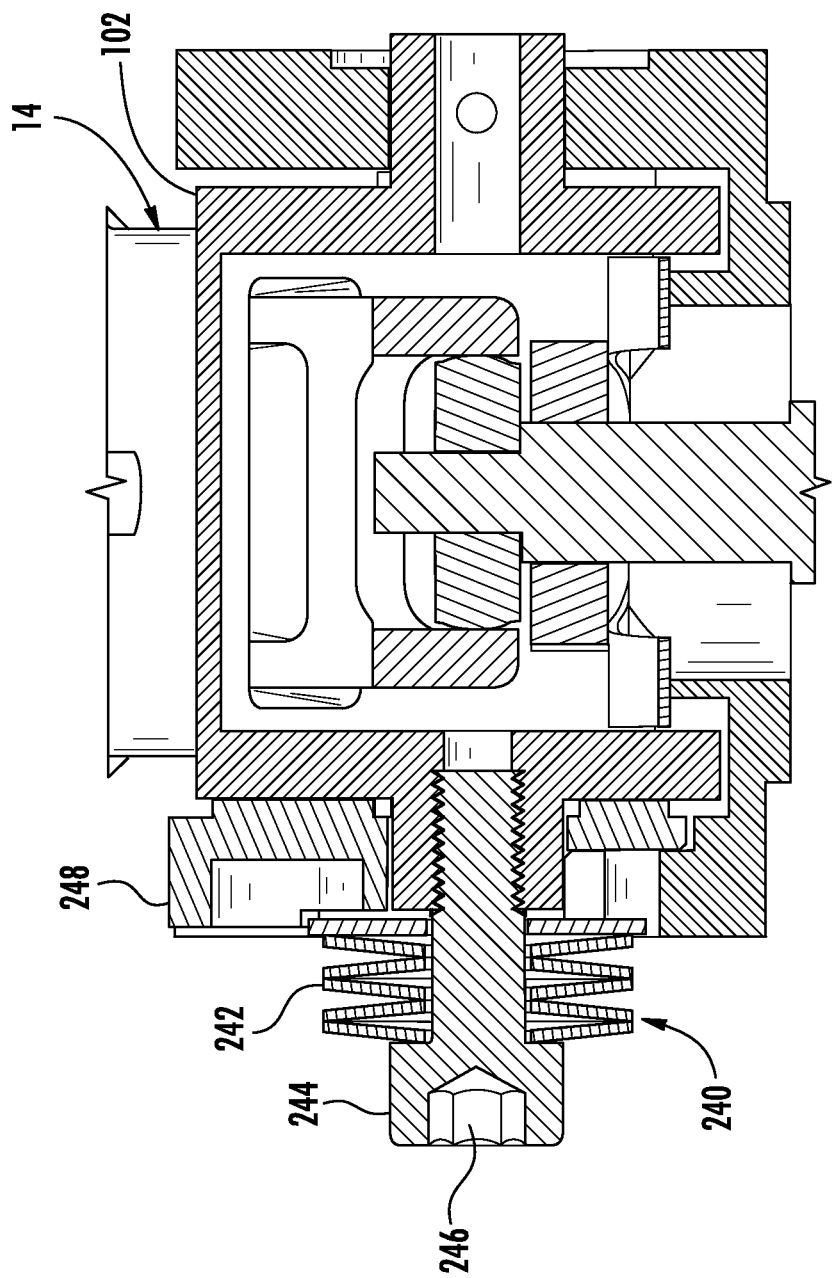
FIG. 14 is a top cross-sectional view of a locking mechanism according to the disclosure.
Figure 15:
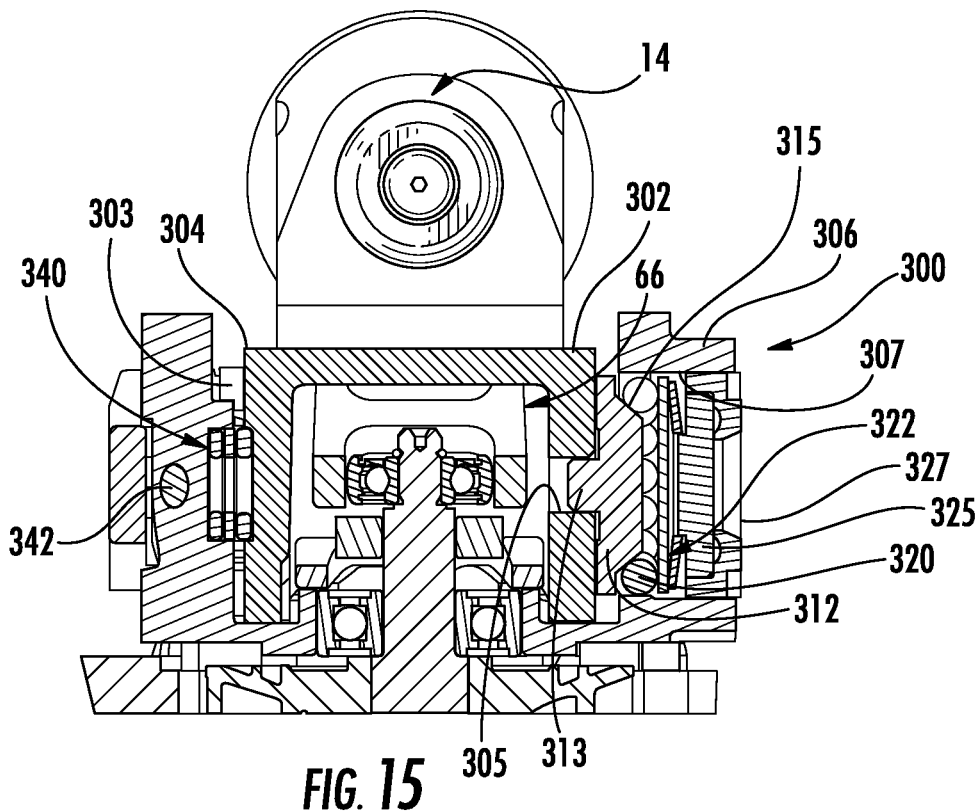
FIG. 15 is a partial cross-sectional view of a locking mechanism according to a further aspect of the disclosure.
Figure 16:
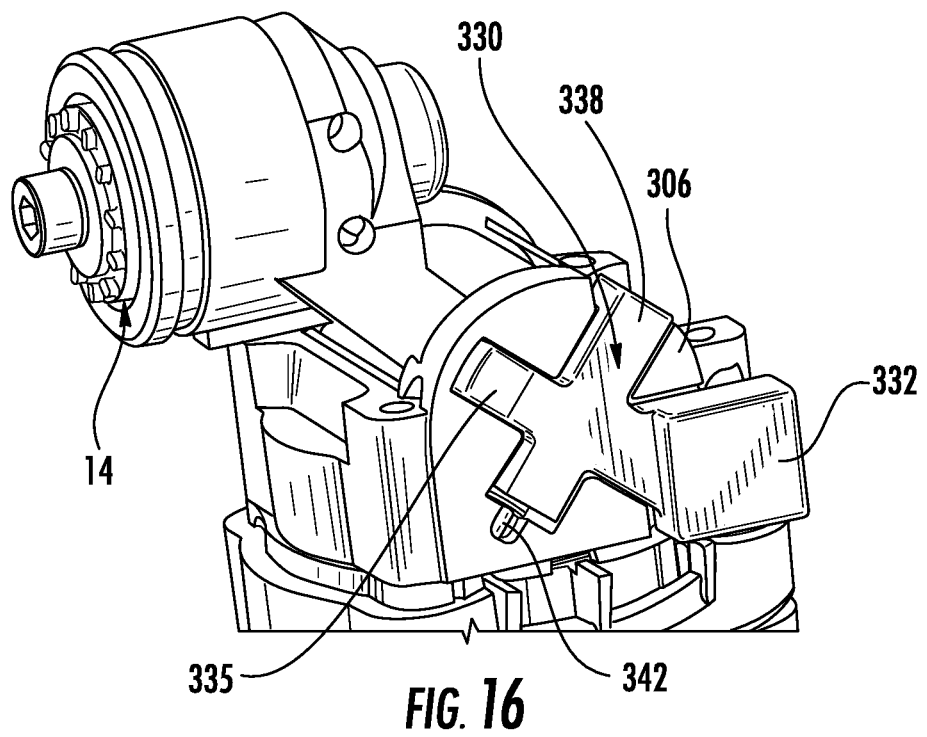
FIG. 16 is a side perspective view of the locking mechanism shown in FIG. 15.

A locking mechanism 240 shown in FIG. 14 includes a spring pack 242 that bears against a pressure plate 248, which in turn presses against the barrel element 102 of the tool holder 14 to prevent further articulation of the tool holder. A locking screw 244 is threaded into the barrel element 102 to compress the spring pack 242 to apply locking pressure as described above. The head of the locking screw 244 may be provided with a tool-receiving recess configured to receive an Allen wrench or similar tool.

A locking mechanism 300 is shown in FIGS. 15-18 that is configured to apply a preloaded clamping load to the tool holder 14. The clamping load is created during the factory assembly process resulting in a more compact assembly. For the locking mechanism 300 the barrel element 302 is similar to the barrel element 102 with the additional feature of a pressure or friction surface 304, an array of teeth 303 and a pivot opening 305. The barrel element 302 is constrained between a pair of thrust bearings 312 and 340. The thrust bearing 312 includes a pivot hub 313 that is rotatably mounted within the pivot opening 305 of the barrel element 302. The thrust bearing 340 is mounted between a housing 306 and the pressure surface 304.

The thrust bearing 312 includes an angled surface 315 extending into a bore 307 of the housing 306. The bore supports a Belleville spring 322 that is captured within the bore by a locking disc 325 and a threaded adjustment disc 327. An array of rolling elements 320 are disposed between the angled surface 315 and the Belleville spring 322 to transmit thrust from the spring to the thrust bearing 312. The amount of thrust can be adjusted by adjusting the threaded adjustment disc 327. The angled surface 315 of the thrust bearing allows rotation of the bearing under load while also ensuring that there is no translation of the tool holder 14 in the X, Y and Z axes. The angled surface 315 of the thrust bearing 312 allows the user to easily rotate the tool holder to a desired angular orientation with minimal effort while the clamping load is never released. The Belleville spring 322 also ensures that the clamping load maintains consistent even as the tool wears.

Figure 17:
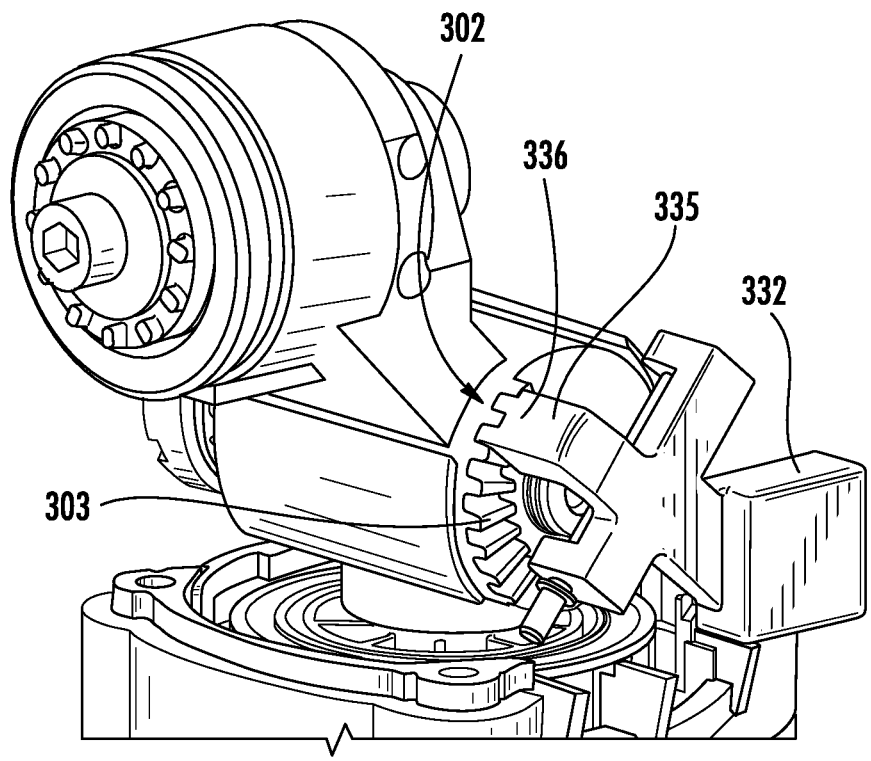
FIG. 17 is a side perspective view of the locking mechanism shown in FIG. 16 with the housing removed.
Figure 18:
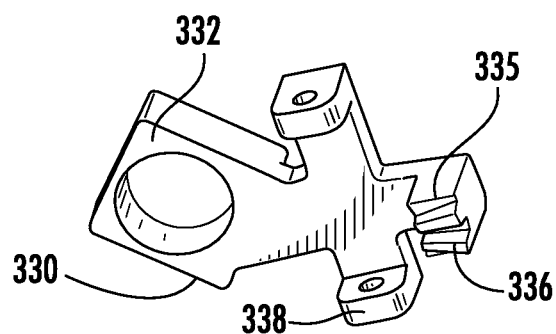
FIG. 18 is an enlarged view of a pivot lever for the locking mechanism shown in FIG. 15.

The second thrust bearing 340 interacts with a pivot mechanism that allows the user to adjust the angular orientation of the tool holder 14. The mechanism includes a pivot lever 330 that is pivotably mounted to the housing 306 by a pivot pin 342 passing through pivot arms 338. As shown in FIG. 18 pivot lever 330 includes a pressure pad 332 that can be depressed by the user. The pivot lever further includes an engagement arm 335 with teeth 336 configured for meshed engagement with the teeth 303 on the barrel element 302, as best seen in FIG. 17. The pivot lever can be spring biased so that the teeth 336 are engaged to the teeth 303. The user can adjust the angle of the tool head by pressing the pad 332 to pivot the engagement arm 335 about the pivot arms 338. The teeth 336 disengage the teeth 303 on the barrel element, thereby allow the barrel element 302 of the tool holder 14 to be pivoted until the tool holder is at a desired angle. The pressure pad can then be released so that the teeth 336 fall into meshed engagement with the teeth on the barrel element, thereby holding the tool holder in the desired orientation.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An articulating power tool comprising:
   a housing;
   a motor located in the housing, the motor including a drive shaft configured for rotation about a first axis;
   an actuator operatively coupled to the drive shaft configured to convert the rotation of the drive shaft to a reversing angular displacement;
   a tool holder coupled to the actuator and configured to move in response to movement of the actuator;
   an articulator operatively coupled to the housing and to the tool holder, the articulator configured to adjust the tool holder through a range of angular positions relative to the housing; and
   a locking mechanism operatively coupled between the articulator and the housing for locking the articulator in a user-selected one of said range of angular positions,
   wherein the articulator includes a barrel element with a clamping surface facing the locking mechanism; and
   wherein the locking mechanism is provided with a mating clamping surface, the clamping surfaces configured to prevent relative rotation when the surfaces are pressed together.

2. The articulating power tool of claim 1, wherein:
   the locking mechanism includes;

a friction plate pack disposed between said clamping surface and said housing said friction plate pack including said mating clamping surface; and a pressure element that is manually tightenable to press the friction plate pack and the articulator together to prevent relative rotation.

3. The articulating power tool of claim 2, wherein said pressure element is a screw threaded through said housing to bear against said barrel of said articulator and press the friction plate pack and articulator together.

4. The articulating power tool of claim 2, wherein the pressure element includes an eccentric lever with an eccentric cam element, the lever pivotably mounted on said housing with said eccentric cam element bearing on said housing, the lever configured to apply pressure to said barrel of the articulator upon rotation of the eccentric cam element relative to the housing.

5. The articulating power tool of claim 4, wherein the pressure element includes a pressure pin coupled to said eccentric cam element and to said articulator so that rotation of said eccentric cam element relative to the housing pulls the pressure pin to thereby pull the articulator toward the friction plate pack.

6. The articulating power tool of claim 1, wherein:
the locking mechanism includes;
    spring pack disposed between said clamping surface and said housing, said spring pack including the mating clamping surface; and
    a pressure element that is manually tightenable to press the spring pack and the articulator together to prevent relative rotation.

7. The articulating power tool of claim 6, wherein said pressure element is a screw threaded through said housing to bear against said barrel of said articulator and press the spring pack and articulator together.

8. The articulating power tool of claim 6, wherein the pressure element includes an eccentric lever with an eccentric cam element, the lever pivotably mounted on said housing with said eccentric cam element bearing on said housing, the lever configured to apply pressure to said barrel of the articulator upon rotation of the eccentric cam element relative to the housing.

9. An articulating power tool comprising:
a housing;
a motor located in the housing, the motor including a drive shaft configured for rotation about a first axis;
an actuator operatively coupled to the drive shaft configured to convert the rotation of the drive shaft to a reversing angular displacement;

a tool holder coupled to the actuator and configured to move in response to movement of the actuator;
an articulator operatively coupled to the housing and to the tool holder, the articulator configured to adjust the tool holder through a range of angular positions relative to the housing; and
a locking mechanism operatively coupled between the articulator and the housing for locking the articulator in a user-selected one of said range of angular positions, wherein the articulator includes a clamping surface; and
wherein the locking mechanism includes a ball-in-ramp mechanism having an input plate, a locking plate opposite said input plate and at least one rolling element disposed between said input plate and said locking plate, said input plate and said locking plate configured to convert movement of said input plate to a force pressing said locking plate into said clamping surface by way of said at least one rolling element.

10. The articulating power tool of claim 9, wherein said input plate and said locking plate each include at least one opposing annular channel corresponding to the at least one rolling element, each of said annular channels configured to receive one of said at least one rolling element for rolling movement therein and each of said annular channels including a ramp surface configured to reduce the distance between the ramp surface of opposing annular channels upon rotation of said input plate.

11. The articulating power tool of claim 10, wherein said movement of said input plate is a rotation of said input plate to produce the rolling movement of said at least one rolling element between said opposing annular channels.

12. The articulating power tool of claim 9, wherein:
the articulator includes a barrel element with said clamping surface facing the locking mechanism; and
said output plate of the locking mechanism is provided with a mating clamping surface facing said clamping surface of the barrel element, the clamping surfaces configured to prevent relative rotation when the surfaces are pressed together.

13. The articulating power tool of claim 12, wherein said clamping surface and said mating clamping surface include a surface treatment configured for enhanced engagement.

14. The articulating power tool of claim 13, wherein the surface treatment includes mating radial splines defined on the clamping surfaces.

15. The articulating power tool of claim 9, wherein said input plate is a carrier within which said at least one rolling element is mounted and said movement of said input plate is a linear movement.

* * * * *